(12) United States Patent
Rueger et al.

(10) Patent No.: US 6,784,596 B2
(45) Date of Patent: Aug. 31, 2004

(54) METHOD OF CHARGING AND DISCHARGING A PIEZOELECTRIC ELEMENT

(75) Inventors: Johannes-Joerg Rueger, Vienna (AT); Udo Schulz, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 10/292,864

(22) Filed: Nov. 8, 2002

(65) Prior Publication Data
US 2003/0168933 A1 Sep. 11, 2003

(30) Foreign Application Priority Data

Nov. 10, 2001 (DE) .......................................... 101 55 391

(51) Int. Cl.[7] .............................................. H01L 41/09
(52) U.S. Cl. .................................................. 310/316.03
(58) Field of Search .................................... 310/316.03

(56) References Cited

U.S. PATENT DOCUMENTS

| | | | |
|---|---|---|---|
| 4,784,102 A | * 11/1988 | Igashira et al. | 123/447 |
| 5,361,014 A | * 11/1994 | Antone et al. | 310/316.03 |
| 6,486,587 B2 | * 11/2002 | Klenk et al. | 310/316.03 |
| 6,619,268 B2 | * 9/2003 | Rueger et al. | 123/490 |
| 6,680,620 B2 | * 1/2004 | Hedenetz et al. | 324/727 |
| 6,700,301 B2 | * 3/2004 | Rueger et al. | 310/316.03 |

* cited by examiner

Primary Examiner—Thomas M. Dougherty
(74) Attorney, Agent, or Firm—Kenyon & Kenyon

(57) ABSTRACT

A method of charging or discharging a piezoelectric element, in which electric charge carriers are transported back and forth between a supply voltage of a direct voltage source and a piezoelectric element in order to transmit an elastic deflection of the piezoelectric element to an actuator. An actuating movement of the actuator is modified as a function of the level of a voltage being applied to the piezoelectric element, a reduction of the level of the applied voltage being compensated for by at least one additional transmission of electric charge carriers during a holding phase of the piezoelectric element.

12 Claims, 2 Drawing Sheets

METHOD OF CHARGING AND DISCHARGING A PIEZOELECTRIC ELEMENT

CROSS-REFERENCE TO RELATED APPLICATIONS

The present application claims priority to Application No. 101 55 391.9, filed in the Federal Republic of Germany on Nov. 10, 2001, which is expressly incorporated herein in its entirety by reference thereto.

FIELD OF THE INVENTION

The present invention relates to a method of charging and discharging a piezoelectric element.

BACKGROUND INFORMATION

Piezoelectric elements have a characteristic of contracting or expanding as a function of a direct voltage applied to them or of a direct voltage established across them. The practical implementation of actuators using piezoelectric elements is suitable in particular when the appropriate actuator has to perform quick and/or frequent movements. Among other things, the piezoelectric element is used in fuel injectors for internal combustion engines. For certain applications it is necessary that the piezoelectric element be able to be brought to different expansions or if needed to varying expansions as precisely as possible, for example, when the piezoelectric element is used as an actuator in a fuel injection system. Through direct or indirect transmission to a control valve, different expansions of the piezoelectric element correspond to the displacement of an actuator, like a nozzle needle for example. The displacement of the nozzle needle results in the opening of injection orifices. The duration of the opening of the injection orifices corresponds to a desired injected fuel quantity as a function of a free cross-section of the orifices and an applied pressure. The transmission of the expansion of the piezoelectric element to the control valve is differentiated into two basic transmission modes. In the first, direct, transmission mode, the nozzle needle is moved directly by the piezoelectric element via a hydraulic coupler. In the second transmission mode, the movement of the nozzle needle is controlled by a control valve which is triggered by the piezoelectric element via a hydraulic coupler. The second, the indirect transmission mode, corresponds to the main industrial application and is the basis for further explanations. The hydraulic coupler has essentially two characteristics; first, the reinforcement of the stroke of the piezoelectric element, and second, the decoupling of the control valve from a static thermal expansion of the piezoelectric element. The hydraulic coupler transmits the elastic deflection of the piezoelectric element to the control valve within a control cycle. In order to function accurately, the coupler must be sufficiently filled with a fluid. In each control cycle, which includes a charging operation, a holding operation, and a discharging operation, a portion of the fluid being present in the coupler is pressed out via leak gaps.

In particular during the charging and holding operation, where the piezoelectric element is charged to a certain voltage, the hydraulic coupler undergoes a certain deflection and moves a valve element of the control valve from a first seat to a second seat. To ensure an accurate opening of the nozzle needle, the valve element of the control valve, as a rule, must be in contact with the second seat and must seal against a high pressure applied in a rail chamber. If this is not the case, as a rule, an unintentional deflection of the actuator occurs due to the pressure changes of a control space above the actuator and thus resulting in an imprecise injected fuel quantity. Due to existing leakage losses at the leak gaps of the hydraulic coupler, a decrease of coupler pressure results during the holding operation. The level of a setpoint direct voltage of the piezoelectric element, applied within the charging operation, is reduced in response to the decrease in the coupler pressure. If the coupler pressure drops to a certain level, then the valve element of the control valve can no longer be held in the second seat and leakages occur in the second seat of the control valve. Thus, after a short time, leakages in the sealing area of the second seat occur, in particular at high pressures in the rail chamber. This results in a pressure change inside the control space. This pressure change results in an unintended actuating movement of the actuator and thus to an imprecise injected fuel quantity. The decrease in the voltage applied to the piezoelectric element during the holding phase indicates a leakproof condition of the control valve on the second seat and thus a correct function of the injector.

SUMMARY

The method according to the present invention provides an actuating movement of the actuator that is changed as a function of the level of the voltage applied to the piezoelectric element, a decrease in the level of the voltage applied during a holding phase being compensated for by at least one additional transmission of electric charge carriers from the direct voltage source to the piezoelectric element. Thereby the pressure in the coupler is elevated again to a level where a leakproof condition in the second seat may be ensured.

In an exemplary embodiment of the present invention, after a reduction in the setpoint direct voltage of the piezoelectric element within the holding operation of the control cycle, a retransmission of electric charge carriers from the direct voltage source to the piezoelectric element takes place at a predefined point in time. This method results in the compensation for the pressure drop in the coupler due to retransmission of electric charge carriers and in the prevention of the movement of the actuator at a wrong instant, and thus in a reliable control and an accurate regulation of the fuel quantity being injected.

The present invention is explained below in greater detail using an exemplary embodiment with reference to the drawing.

DETAILED DESCRIPTION

Figure 1:
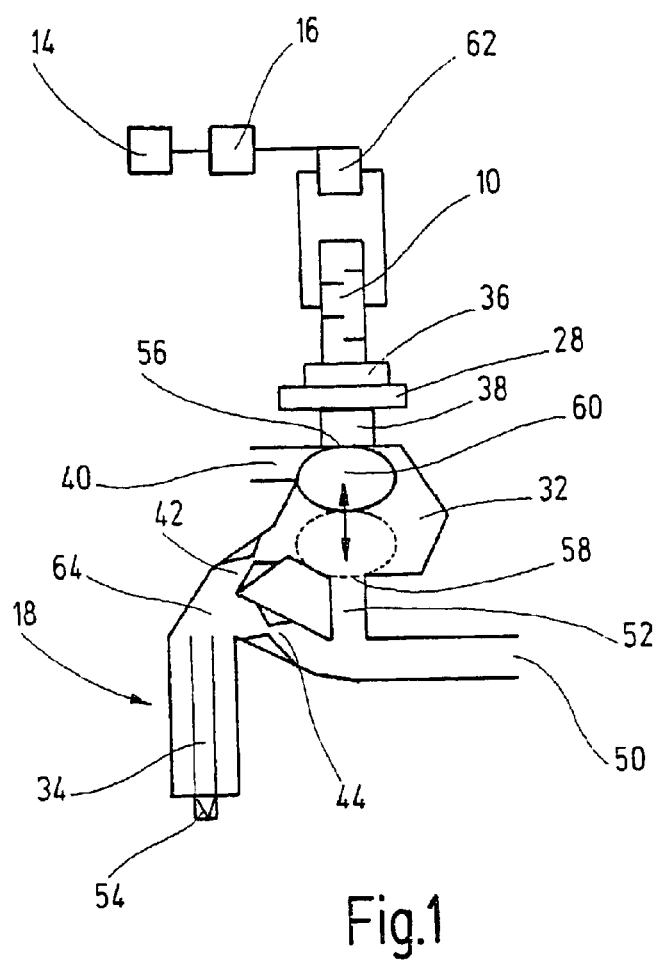
FIG. 1 is a schematic illustration of the method for a fuel injector.
Figure 2:
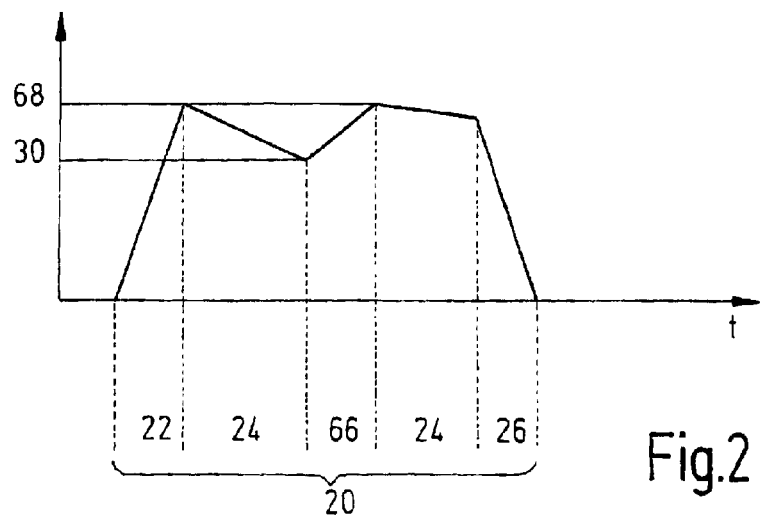
FIG. 2 is a diagram of the voltage characteristic of a control cycle as a function of time.

FIG. 1 illustrates a method according to the present invention. A supply voltage 14 feeds a direct voltage source 16 which supplies a charging and discharging unit 62. Electric charge carriers of direct voltage source 16 are transmitted to and from piezoelectric element 10. The transmission occurs within a control cycle 20, which includes a charging operation 22, a holding operation 24, and a discharging operation 26 (FIG. 2). During charging operation 22 and essentially during holding operation 24, piezoelectric element 10 is mechanically deflected. The mechanical deflection occurs by applying a predefined direct voltage 12 and reaches the predefined deflection at the end of charging operation 22 at a setpoint direct voltage 68.

The respective charging operation 22 is illustrated in FIG. 2 in a voltage/time diagram.

The maximum deflection of piezoelectric element 10 is transmitted to a hydraulic coupler 28 via a piston 36, as illustrated in FIG. 1. The transmission occurs from hydraulic coupler 28 to a piston 38 and subsequently to a control valve 32. Between piston 36 and hydraulic coupler 28 and piston 38, part of the fluid present in hydraulic coupler 28 is pressed out of the hydraulic coupler via leak gaps in each control cycle 20.

A valve element 60 of control valve 32 is situated initially in a first seat 56. After triggering of piezoelectric element 10 and transmission of the mechanical deflection of piezoelectric element 10 via piston 36, hydraulic coupler 28, and piston 38, valve element 60 is displaced from first seat 56 to a second seat 58. This closes a rail bypass 52 of a rail chamber 50, which is under high rail pressure. In the further example embodiments, it may be assumed that the rail pressure in rail chamber 50 is kept constant. After valve element 60 has reached second seat 58 in control valve 32, holding operation 24 starts within control cycle 20.

According to FIG. 1, liquid fuel already present inside control valve 32 and in a control space 64 flows to control space 64 via an inlet throttle 44 during holding operation 24. A portion of the fuel from control space 64 reaches return line 40 via an outlet throttle 42, resulting in a drop of rail chamber dependent pressure in control space 64, and actuator 18 opens. The opening of actuator 18 is triggered by the pressure-dependent deflection of a nozzle needle 34, whereby injection orifices 54 are opened.

Figure 3:
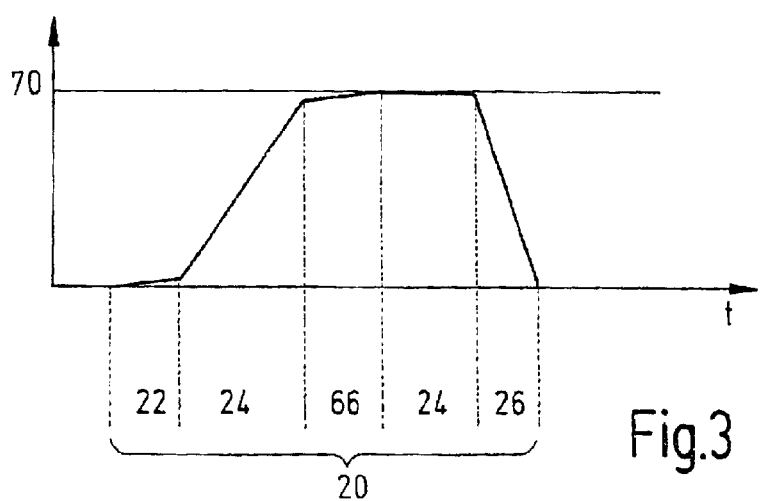
FIG. 3 is a diagram of the injected fuel quantity within a control cycle as a function of time.

FIG. 3 illustrates a charging operation 22 and subsequent holding operation 24 on the basis of a diagram which illustrates injected fuel quantity 70 as a function of time. It is recognizable that—after a hydraulic delay within the charging operation, caused by the inertia of hydraulic coupler 28, as well as of hydraulically operated nozzle needle 34—after completion of charging operation 22 a fuel quantity 70 is injected, in particular during holding operation 24.

If the coupler pressure drops, because of the leakage effects between piston 36 and piston 38, then setpoint direct voltage 68 of piezoelectric element 10 drops during holding operation 24, according to FIG. 2. Due to the dropping pressure in the coupler, valve element 60 is no longer securely held in second seat 58. Additional leakages in the sealing area between valve element 60 and rail bypass 52 occur initially.

FIG. 2 illustrates, on the basis of the characteristic curve, the direct voltage drop of setpoint direct voltage 68 to lower voltage limit 30 within holding operation 24.

FIG. 3 illustrates that injected fuel quantity 70 may remain unaffected by the drop of setpoint direct voltage 68 within holding operation 24 and may even further increase, since the drop in setpoint direct voltage 68 to lower voltage limit 30 may not yet result in a displacement of valve element 60 from second seat 58.

A further drop in the coupler pressure during holding operation 24 to below lower voltage limit 30 may result in displacement of valve element 60 from the second seat in the direction of the first seat and opening of rail bypass 52. Due to the opening of rail bypass 52, the rail pressure of rail chamber 50 acts via opened rail bypass 52 on the back of outlet throttle 42 and via inlet throttle 44 back to inlet throttle 44 on the front of outlet throttle 42. Through this procedure, the pressure rises in control space 64 compared to the situation of a closed rail bypass 52. The pressure rise in control space 64 results in an unintended closing operation of actuator 18, in particular nozzle needle 34. Therefore a smaller cross-section of injection orifices 54 is opened and desired injected fuel quantity 70 is not achieved.

This procedure is not illustrated in FIGS. 1 through 4, since according to the present invention, as shown in FIG. 2, a compensation operation 66 is added when a lower voltage limit 30 is reached. Piezoelectric element 10, being isolated from the voltage supply during holding operation 24, is triggered again after the drop of setpoint direct voltage 68 to lower voltage limit 30 and a new transmission of electric charge carriers of direct voltage source 16 to piezoelectric element 10 takes place. Compensation operation 66 may hereby ensure that valve element 60 is held further on second seat 58 of control valve 32.

It is further possible, according to the present invention, to repeat compensation operation 66 several times during holding operation 24.

The method is not limited to returning the voltage from lower voltage limit 30 to setpoint direct voltage 68 within compensation operation 66. There is the possibility, while leaving the process steps described so far (charging operation 22 and holding operation 24) unchanged, to raise the reduced setpoint direct voltage 68 to a voltage level 72 which lies above setpoint direct voltage 68. This possible process step is illustrated in FIG. 4 on the basis of the characteristic curve within compensation operation 66.

Figure 4:
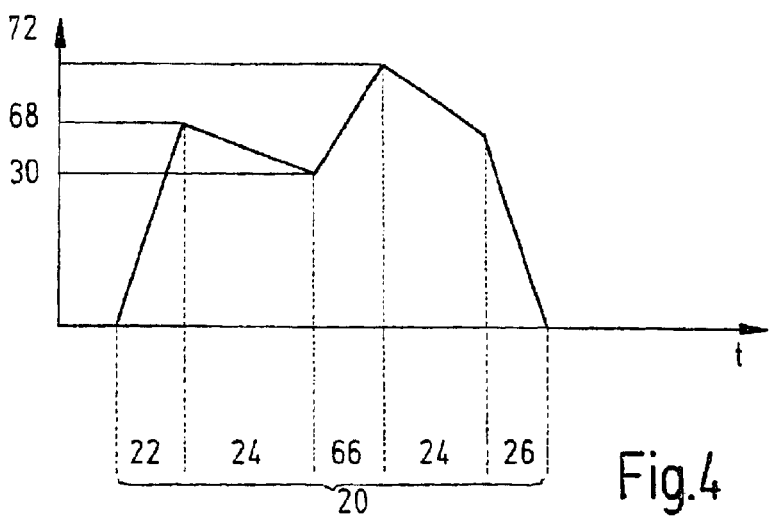
FIG. 4 is a diagram of the voltage characteristic of a control cycle as a function of time.

As illustrated in FIG. 1 and FIG. 4, compensation operation 66 may be followed by an additional holding operation 24 in which a voltage drop is observed again as a function of setpoint direct voltage 68 according to FIG. 2 or voltage level 72 according to FIG. 4.

As illustrated in FIG. 3, injected fuel quantity 70 also remains constant during holding operation 24 following compensation operation 66.

In practice, discharging operation 26 follows within one of the above mentioned holding operations 24 before reaching lower voltage limit 30. Due to the retransmission of electric charge carriers from the piezoelectric element to charging/discharging unit 62, the elastic deflection of piezoelectric element 10 is canceled. The rail pressure of rail chamber 50 acts on valve element 60. Starting from piezoelectric element 10 via pistons 36 and 38, the pressure of hydraulic coupler 28, causing the deflection of valve element 60, is canceled. Valve element 60 leaves second seat 58 and closes return line 40 and is displaced back onto first seat 56. Due to the restored rail pressure of rail chamber 50 inside of control valve 32 and control space 64, actuator 18, in particular nozzle needle 34, are again completely closed. Injected fuel quantity 70 drops back to zero, as FIG. 3 illustrates on the basis of the characteristic curve.

It has been assumed in the previous explanations that compensation (re-loading) takes place when voltage limit 30 is reached. It is however also within the framework of the present invention if compensation starts at a preselectable point in time, independently of the actual voltage across piezoelectric element 10. For example, compensation may be initiated after a preselectable time period has elapsed after the start of holding operation 24. It is also possible to repeat the compensation automatically in preselectable time intervals within the holding operation.

What is claimed is:

1. A method of one of charging and discharging a piezoelectric element, comprising:

transporting electric charge carriers back and forth between a direct voltage source and a piezoelectric element in order to transmit an elastic deflection of the piezoelectric element to an actuator;

modifying an actuating movement of the actuator as a function of a level of a voltage being applied to the piezoelectric element; and compensating for a reduction in the level of the applied voltage by at least one additional transmission of electric charge carriers during a holding phase of the piezoelectric element.

2. The method according to claim 1, wherein the charge carriers are transmitted in the transmitting step from the direct voltage source to the piezoelectric element within a control cycle.

3. The method according to claim 2, wherein the control cycle includes a charging operation, a subsequent holding operation, and a discharging operation.

4. The method according to claim 3, further comprising transmitting the elastic deflection of the piezoelectric element, resulting from the control cycle, directly to the actuator via a hydraulic coupler.

5. The method according to claim 3, further comprising transmitting the elastic deflection of the piezoelectric element, resulting from the control cycle, to the actuator via a hydraulic coupler indirectly via a control valve.

6. The method according to claim 1, wherein the compensating is performed after the voltage applied to the piezoelectric element reaches a lower voltage limit.

7. The method according to claim 3, further comprising repeating the compensating of the voltage drop several times within the holding operation as a function of the reduction of the level of a setpoint direct voltage of the piezoelectric element.

8. The method according to claim 1, further comprising selecting the level of the voltage across the piezoelectric element to be higher than an initial setpoint direct voltage.

9. The method according to claim 1, wherein the compensating is initiated as a function of time.

10. The method according to claim 3, wherein the compensating is initiated as a function of time.

11. The method according to claim 10, wherein the compensating is initiated after expiration of a preselectable time period after a start of the holding operation.

12. The method according to claim 10, wherein the compensating is initiated automatically in preselectable time intervals within the holding operation.

* * * * *